H. C. GARDNER.
METHOD OF AND APPARATUS FOR DRYING AIR.
APPLICATION FILED NOV. 17, 1904.

910,525.

Patented Jan. 26, 1909.

3 SHEETS—SHEET 2.

Witnesses:
Robert H. Weir
Emil E. Wertmann

Inventor:
Henry C. Gardner
By Adams, Packard & Jackson
Attys

H. C. GARDNER.
METHOD OF AND APPARATUS FOR DRYING AIR.
APPLICATION FILED NOV. 17, 1904.
910,525.
Patented Jan. 26, 1909.
3 SHEETS—SHEET 3.
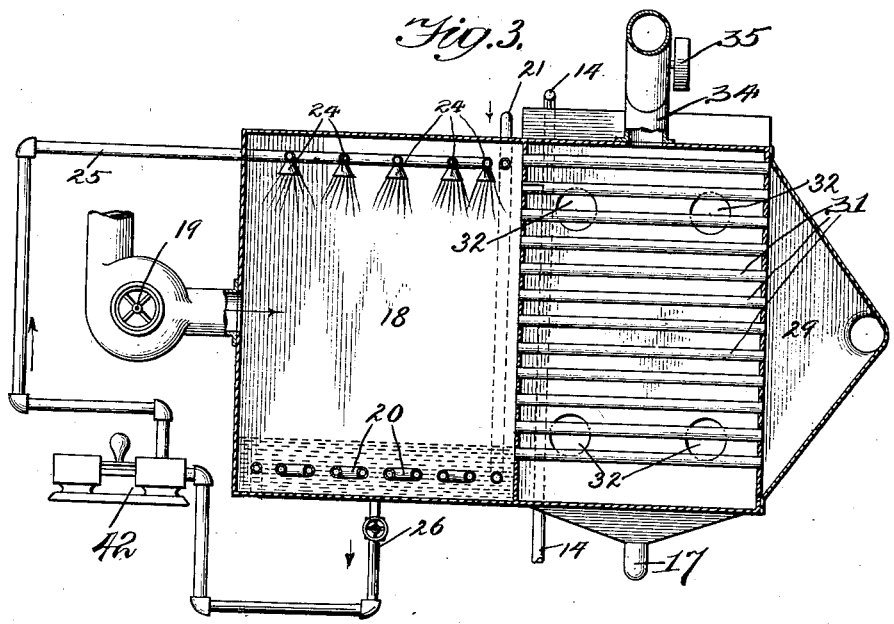
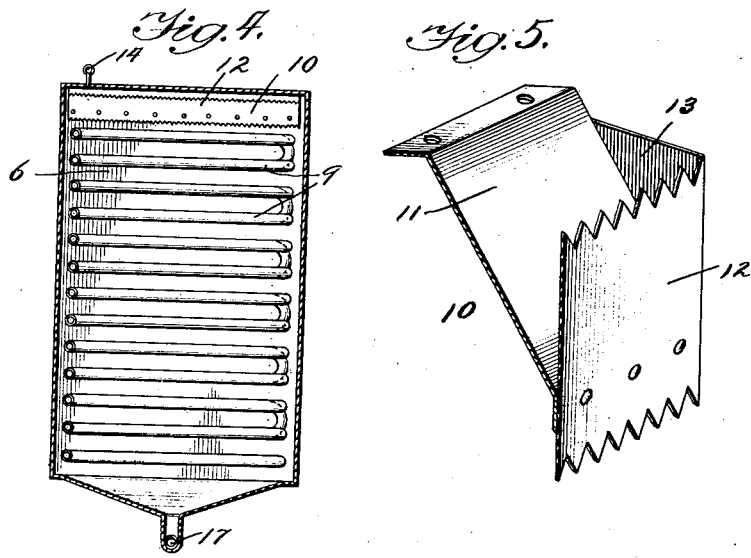

UNITED STATES PATENT OFFICE.

HORACE C. GARDNER, OF CHICAGO, ILLINOIS.

METHOD OF AND APPARATUS FOR DRYING AIR.

No. 910,525.      Specification of Letters Patent.      Patented Jan. 26, 1909.

Application filed November 17, 1904. Serial No. 233,196.

*To all whom it may concern:*

Be it known that I, HORACE C. GARDNER, a citizen of the United States, residing at Chicago, in the county of Cook and State of Illinois, have invented a certain new and useful Method of and Apparatus for Drying Air, of which the following is a specification, reference being had to the accompanying drawings.

My invention relates to a new and improved method of and apparatus for drying air for use in blast furnaces and other purposes.

It is well known that air thoroughly dried is more efficient in blast furnaces than air in which moisture is allowed to remain, and I have discovered that by simultaneously refrigerating the air and subjecting it to the action of a hygroscopic agent the air may be efficiently dried; and, broadly stated, this is the gist of my invention. In carrying out this invention I have also found that if the air is first cooled—for instance, by washing it with a spray of cold liquid—the cooling of the air, if it is saturated, will deprive it of a portion of its moisture, and passing the air thus cooled along and subjecting it to the action of a refrigerated hygroscopic agent, the process will be facilitated. In the carrying out of my invention too I have found that it may be efficiently practiced by first cooling the air, as above described, and then passing it into a chamber where it is brought in contact with a refrigerated liquid having hygroscopic properties and suitably disposed to act efficiently upon the air passing through the chamber. The liquid which I prefer to use for this hygroscopic agent is a brine of calcium chlorid.

For the carrying out of my method of drying air I have also invented a new and improved apparatus, which is illustrated in the accompanying drawings. It is obvious, however, that my process or method of drying air may be carried out by other means.

Figure 1:
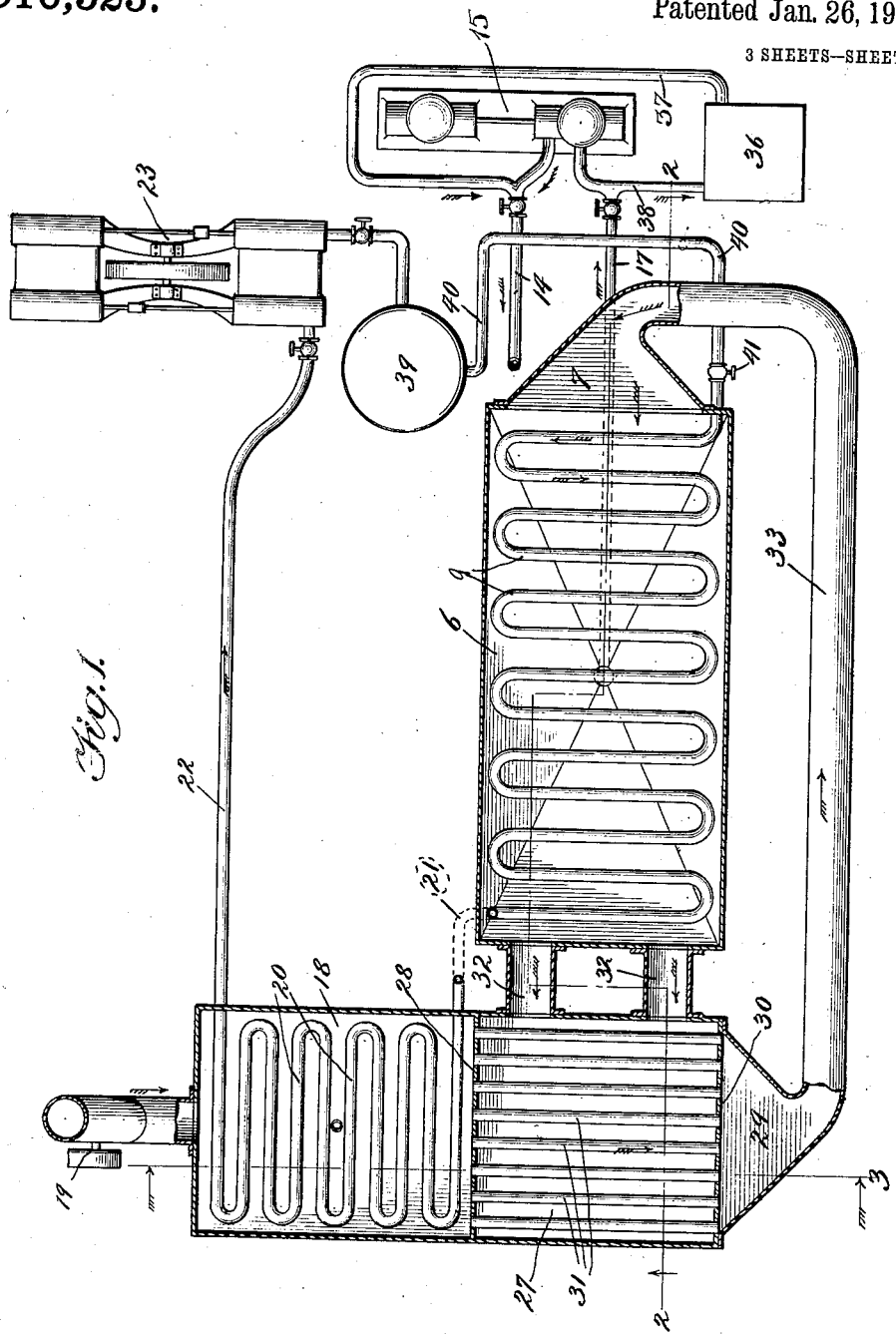
Figure 2:
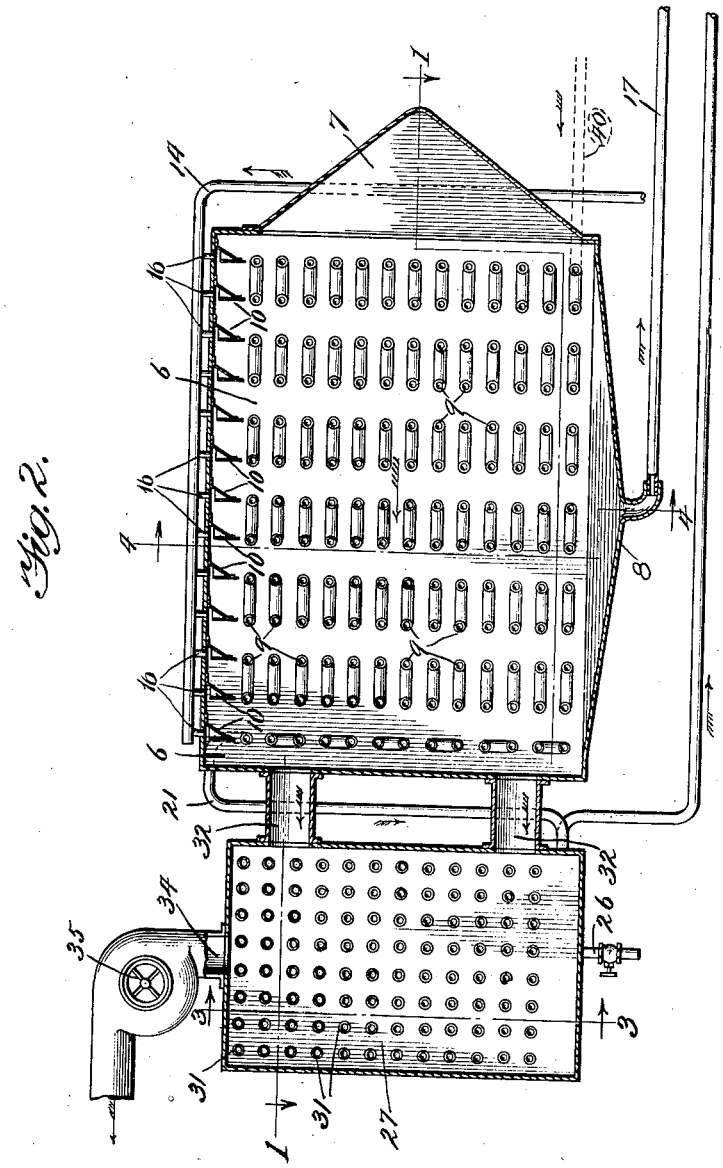

In the drawings, Figure 1 is a top or plan view, partially in horizontal section on line 1—1 of Fig. 2; Fig. 2 is a vertical section on line 2—2 of Fig. 1; Fig. 3 is a vertical section on line 3—3 of Fig. 1, or on line 3—3 of Fig. 2; Fig. 4 is a vertical section on line 4—4 of figure 2; and Fig. 5 is an enlarged detail, being an isometric view of a portion of one of the brine troughs from which the brine is distributed over the refrigerating coils.

Referring to the drawings,—6 indicates a chamber, having a flaring or pyramidal-shaped front 7 and a bottom 8, which slopes from its sides toward the center. The chamber 6 is provided with a number of coils of pipe 9, which are connected with one another to form a continuous series of coils laid from one to the other in such a way that liquid passed into the lower coil at the bottom of the right-hand end, shown in Fig. 2, will pass through and out at the top coil at the left-hand end, as shown in Fig. 2.

10 indicates a number of troughs, which are suspended from the top of chamber 6 and extend laterally across the same the length of the coils of pipes 9. These troughs are constructed in the manner shown and described in Letters Patent to me, No. 654,725, of date of July 31, 1900. Fig. 5 shows an isometric view of a portion of one of these troughs. As is shown in that figure, the troughs are V-shaped, and are composed of two side members 11—12 and two end members 13. The side member 11 is somewhat higher than the end members 13 and the other side member 12, as is best shown in Fig. 5, and is provided with openings by which it may be bolted, or otherwise secured to the top of the chamber 6. The top and bottom edges of the side member 12 are serrated, as is shown in Fig. 5, and the troughs are so disposed that the bottom edge of the serrated portion 12 lies over the pipes of the top coil, as is shown in Fig. 2; and as is shown in said figure the said coils of pipe are arranged so that the pipes of the different layers of the coil may lie substantially over one another.

14 indicates a pipe, which is connected with a pump 15 and is laid above the chamber 6, extending substantially the length thereof, as is best shown in Fig. 2. The portion of the pipe extending over the chamber 6 is provided with a series of outlet nozzles 16 which pierce the top of the chamber 6 and open on the inside thereof immediately above the troughs 10.

17 indicates a pipe opening from the bottom of the chamber 6 and leading to the pump 15.

36 indicates an evaporator, which may be of any well-known and approved form, preferably a multiple-effect vacuum evaporator. As this evaporator may be of any well-known and approved construction, I have indicated it only conventionally.

37 indicates a pipe leading from the evaporator 36 to the pipe 14.

38 indicates a by-pass pipe leading from the pipe 17 to the evaporator 36.

The pump 15, when set in motion, pumps a supply of hygroscopic liquid, preferably a brine of calcium chlorid, through the pipe 14, whence it is discharged through the nozzles 16 into the troughs 10. When the troughs 10 fill, the liquid will pass over the serrated edges upon the top of the side member 12 and, running down the side, will be discharged from the points on the lower serrated edges upon the tubes of the top coils 9, from which it will drip upon each pipe to the pipe below it, wetting the surfaces of all the coils in the chamber 6. From the lowest coils it will drop into the bottom of the chamber, from which it will be pumped through the pipe 17 back into the pump 15 and thence out through the tube 14, keeping up a constant circulation. Inasmuch as the moisture will be taken out of the air in the manner hereinafter described, the moisture so extracted will be constantly added to the brine, which would weaken the solution. In order to prevent this, the by-pass pipe 38 is adapted to constantly draw from the pipe 17 a suitable percentage of the brine passing through the pipe 17 and convey it to the evaporator 36, where it is evaporated and concentrated; and the concentrated liquid passes through the pipe 37 into pipe 14, thus preserving the normal strength of the solution.

18 indicates a chamber into which air may be driven by means of a fan 19.

20 indicates a series of coils of pipe located near the bottom of the chamber 18 and connected by a pipe 21 with the last of the coils of pipe 9 in the chamber 6. As is best shown in Fig. 1, the coils of pipe 20 form a continuous passage, and are led out of the chamber 18 by means of a pipe 22.

23 indicates an ammonia compressor of any suitable construction.

24 indicates a pipe, which leads from the ammonia compressor 23 to a condenser 39. The condenser 39 may be of any approved and well-known form and construction, and hence is indicated only conventionally.

40 indicates a pipe, which leads from the condenser 39 and connects with the lowest one of the coils 9, as indicated in dotted lines in Fig. 2.

41 indicates an ammonia expansion-valve, which is located in the pipe 40 near the chamber 6.

When the ammonia compressor 23 is operated, the ammonia is compressed to a suitable degree, say twelve atmospheres, and is forced into the condenser 39, where it is deprived of its heat sufficiently to liquefy it. The ammonia expansion-valve 41, which is of any suitable form and construction, is opened and the liquid ammonia passes into the coils 9 in the chamber 6. Flowing through all the coils it expands into gas, and, passing out through the pipe 21 through the coils 20 and the pipe 22, is led back again at a low pressure into the compressor 23, where it is again compressed and the operation repeated. The effect of causing the liquid ammonia to flow into the coils 9, and expanding on its way, to pass through the pipes 21 and coils 20 is to refrigerate to a low temperature the coils 9 in the chamber 6, and to cool the coils 20, which will, of course, not be cooled so much as the coils 9 as most of the work is done in the chamber 6. As the calcium chlorid brine passes from the troughs 12 over the pipes 9 it covers the surfaces of the pipes 9 and is refrigerated to a low temperature.

24 indicates spray roses, which are located in the top of the chamber 18, and are connected by means of a pipe 25, as is best shown in Fig. 3, to any suitable pump or other mechanism, as 42, by means of which water may be forced through the spray roses and sprayed through the chamber 18, where it falls to the bottom of the chamber and rises above the coils 20, forming a reservoir of water.

26 indicates a pipe leading out of the bottom of the chamber 18, which is connected to the pump 42, from which the water is pumped into the spray roses 24. In other words, the water at the bottom of the chamber 18 forms a reservoir from which the water is pumped and kept in circulation through the pipes 26 and 25 and through the spray roses 24 into the chamber. The pipes 20, being refrigerated, as above described, will cool the water greatly, whereby a spray of cold water will pass from the roses 24 into the chamber 18.

27 indicates a chamber located beside the chamber 18 and separated therefrom by a partition 28.

29 indicates a pyramidal chamber upon one side of the chamber 27 and separated from it by a partition 30.

31 indicates a series of tubes set in the partitions 28 and 30 and opening at one end into the chamber 18 and at the other end into the pyramidal-shaped chamber 29. The chamber 27 is connected by passages 32 with the chamber 6.

33 indicates a pipe, which connects the chamber 29 with the pyramidal-shaped end 7 of the chamber 6.

34 indicates a discharge tube opening from the top of the chamber 27, and provided with an exhaust fan 35.

Atmospheric air is forced by the fan 19 into the chamber 18, where, the pumps being set in operation, it is sprayed by the cold water issuing from the spray roses 24. The air in the chamber 18 is thus considerably cooled, and if it is saturated is deprived of a portion of its moisture. The spraying of the air by cold water in the chamber 18 will, it is understood, be done only in case the air entering said chamber is warm and practically saturated with moisture. If the atmospheric condition already be such that the air entering the chamber is already cold and relatively dry, the pumping the water through the spray roses will not be operated. In either case, the air passes from the chamber 18 through the tubes 31 into the pyramidal chamber 29, and thence through the pipe 33 into the pyramidal head 7 of the chamber 6, whence it is forced through the chamber 6. Passing through the chamber 6, it is brought in contact with the hygroscopic liquid, such as. brine of calcium chlorid, which has been supplied to the coils of pipe in the chamber 6 and refrigerated to a very low degree, as above described. Being brought thus in contact with the refrigerating hygroscopic liquid, the air is refrigerated and the combined action of the refrigerating of the air and of the action upon it by the brine of calcium chlorid is to deprive the air of its moisture and to thoroughly dry it. The air thus thoroughly dried passes through the pipes 32 into the chamber 27, from whence it is drawn by the exhaust fan 35 through the pipe 34 and conducted to the place at which it is to be used.

The chamber 27 it will be seen operates as a heat exchanger. The cold dry air passing from the chamber 6, through and out of said chamber 27, will cool the air passing from the chamber 18 in the pipes 31, and thus will render the further cooling of the air in the chamber 6 easier. At the same time, the warmer air passing from the chamber 18, through the pipes 31, will raise the temperature of the cold dry air issuing from the chamber 6, and the thoroughly dried air drawn from the chamber 27 by the fan 35 will be raised in temperature considerably above the temperature at which it issues from the chamber 6 thoroughly dried.

That which I claim as my invention and desire to secure by Letters Patent is,—

1. The process of drying air, which consists in passing it through a heat exchanger, thence passing it through a chamber in which the air while passing through the chamber is subjected to the action of refrigerating means and to the action of a refrigerated hygroscopic agent, thence passing the air from said chamber through said heat-exchanger, and during said process maintaining said hygroscopic agent at a substantially constant strength.

2. The process of drying air which consists in first cooling the air, then passing it through a heat-exchanger, thence passing it through a chamber in which the air while passing through the chamber is subjected to the action of refrigerating means and to the action of a refrigerated hygroscopic agent, thence passing the air from said chamber through said heat-exchanger, and during said process maintaining said hygroscopic agent at a substantially constant strength.

3. In an apparatus for drying air, the combination with a chamber, a series of pipe coils in said chamber, means for refrigerating said pipes, means for distributing a hygroscopic solution over said refrigerated pipes, means for keeping said hygroscopic solution in circulation through said chamber, and means for maintaining said hygroscopic solution at a substantially constant strength, of a heat exchanger, connections between said heat exchanger and said chamber, and means for forcing air through said heat exchanger, thence into and through said chamber, thence again into and through said heat exchanger, substantially as described.

4. In an apparatus for drying air, the combination with a chamber, a series of pipe coils in said chamber, means for refrigerating said pipes, means for distributing a hygroscopic solution over said refrigerated pipes, means for keeping said hygroscopic solution in circulation through said chamber, and means for maintaining said hygroscopic solution at a substantially constant strength, of a second chamber, means for spraying cold water through said second chamber, connections between said first chamber and said second chamber, and means for forcing air through said second chamber thence into and through said first chamber, substantially as described.

5. In an apparatus for drying air, the combination with a chamber, a series of pipe coils in said chamber, means for distributing a hygroscopic solution over said pipes, a second chamber, pipe coils in said second chamber, and means for refrigerating said pipe coils in said two chambers, of means for drawing a supply of water in said second chamber therefrom and spraying it into said second chamber, a third chamber, pipes passing from said second chamber through said third chamber, connections between said third chamber and said first chamber, and means for forcing air into said second chamber thence through said pipes into said first chamber thence through said first chamber into and through said third chamber, substantially as described.

HORACE C. GARDNER.

Witnesses:
MINNIE A. HUNTER,
CHARLES E. PICKARD.